(12) United States Patent
Song et al.

(10) Patent No.: US 11,841,921 B2
(45) Date of Patent: Dec. 12, 2023

(54) MODEL TRAINING METHOD AND APPARATUS, AND PREDICTION METHOD AND APPARATUS

(71) Applicant: BEIJING BAIDU NETCOM SCIENCE AND TECHNOLOGY CO., LTD., Beijing (CN)

(72) Inventors: Xibin Song, Beijing (CN); Dingfu Zhou, Beijing (CN); Jin Fang, Beijing (CN); Liangjun Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 385 days.

(21) Appl. No.: 17/112,247

(22) Filed: Dec. 4, 2020

(65) Prior Publication Data
US 2021/0406599 A1    Dec. 30, 2021

(30) Foreign Application Priority Data

Jun. 26, 2020   (CN) .......................... 202010593221.X

(51) Int. Cl.
*G06T 7/50*    (2017.01)
*G06N 20/00*    (2019.01)
(Continued)

(52) U.S. Cl.
CPC .......... *G06F 18/214* (2023.01); *G06N 20/00* (2019.01); *G06T 3/40* (2013.01); *G06T 7/50* (2017.01);
(Continued)

(58) Field of Classification Search
None
See application file for complete search history.

(56) References Cited

U.S. PATENT DOCUMENTS

2020/0258249 A1*  8/2020 Angelova ................. G06T 7/20

FOREIGN PATENT DOCUMENTS

CN    108389226 A     8/2018
CN    110009674 A     7/2019
(Continued)

OTHER PUBLICATIONS

Combined Search and Examination Report of United Kingdom Application No. Application 2019743.0, dated Jun. 11, 2021 (8 pages).

*Primary Examiner* — Randolph I Chu
(74) *Attorney, Agent, or Firm* — Quarles & Brady LLP; James J. Aquilina

(57) ABSTRACT

The present application provides a model training method and apparatus, and a prediction method and apparatus, and it relates to fields of artificial intelligence, deep learning, image processing, and autonomous driving. The model training method includes: inputting a first sample image of sample images into a depth information prediction model, and acquiring depth information of the first sample image; acquiring inter-image posture information based on a second sample image of the sample images and the first sample image; acquiring a projection image corresponding to the first sample image, at least according to the inter-image posture information and the depth information; and acquiring a loss function by determining a function for calculating a similarity between the second sample image and the projection image, and training the depth information prediction model using the loss function.

20 Claims, 5 Drawing Sheets

(51) Int. Cl.
*G06F 18/214* (2023.01)
*G06V 10/42* (2022.01)
*G06T 3/40* (2006.01)

(52) U.S. Cl.
CPC .... *G06V 10/42* (2022.01); *G06T 2207/10028* (2013.01); *G06T 2207/20081* (2013.01); *G06T 2207/20084* (2013.01)

(56) References Cited

FOREIGN PATENT DOCUMENTS

| | | |
|---|---|---|
| CN | 110800023 A | 2/2020 |
| CN | 111311685 A | 6/2020 |
| CN | 111652921 A | 9/2020 |
| EP | 3776468 A1 | 2/2021 |
| WO | 2019099684 A1 | 5/2019 |
| WO | WO-2019231104 A1 * 12/2019 ......... G06K 9/00718 |

* cited by examiner

MODEL TRAINING METHOD AND APPARATUS, AND PREDICTION METHOD AND APPARATUS

CROSS-REFERENCE TO RELATED APPLICATION

This application claims priority to Chinese patent application No. 202010593221.X, filed on Jun. 26, 2020, which is hereby incorporated by reference in its entirety.

TECHNICAL FIELD

The present application relates to the field of computer technology, and in particular, to the fields of artificial intelligence, deep learning, image processing, and autonomous driving.

BACKGROUND

In the related art, solutions of supervised depth information estimation generally take a color image as an input, and estimate depth information of the color image by means of machine learning, such as convolutional neural network.

SUMMARY

The present application provides a model training method and apparatus, and a prediction method and apparatus.

In a first aspect, there is provided a model training method, including:
inputting a first sample image of sample images into a depth information prediction model, and acquiring depth information of the first sample image;
acquiring inter-image posture information based on a second sample image of the sample images and the first sample image;
acquiring a projection image corresponding to the first sample image, at least according to the inter-image posture information and the depth information; and
acquiring a loss function by determining a function for calculating the similarity between the second sample image and the projection image, and training the depth information prediction model using the loss function.

In a second aspect, there is provided a prediction method, including:
acquiring an image to be predicted; and
inputting the image to be predicted into a depth information prediction model, and acquiring depth information of the image to be predicted output by the depth information prediction model;
wherein the depth information prediction model is trained using the model training method provided in the present application.

In a third aspect, there is provided a model training apparatus, including:
a depth information acquisition module configured for inputting a first sample image of sample images into a depth information prediction model, and acquiring depth information of the first sample image;
an inter-image posture information acquisition module configured for acquiring inter-image posture information based on a second sample image of the sample images and the first sample image;
a projection image acquisition module configured for acquiring a projection image corresponding to the first sample image at least according to the inter-image posture information and the depth information; and
a loss function acquisition module configured for acquiring a loss function by determining a function for calculating the similarity between the second sample image and the projection image, and training the depth information prediction model using the loss function.

In a fourth aspect, there is provided a prediction apparatus, including:
a to-be-predicted image acquisition module configured for acquiring an image to be predicted; and
a prediction module configured for inputting the image to be predicted into a depth information prediction model, and acquiring depth information of the image to be predicted output by the depth information prediction model;
wherein the depth information prediction model is trained using the model training apparatus provided in the present application.

It should be understood that the above content is not intended to identify key or critical features of embodiments of the present application, and should not be construed as limiting the scope of the present application. Further features of the present application may be readily understood from the following detailed description.

BRIEF DESCRIPTION OF THE DRAWINGS

The drawings are used to make the present application better understood and would not be used as a limitation to the present application, wherein.

DETAILED DESCRIPTION

The exemplary embodiments of the application will be described below in combination with drawings, including various details of the embodiments of the application to facilitate understanding, which should be considered as exemplary only. Therefore, those of ordinary skill in the art should realize that various changes and modifications can be made to the embodiments described herein without departing from the scope and spirit of the present application. Likewise, descriptions of well-known functions and structures are omitted in the following description for clarity and conciseness.

Regarding the above mentioned solutions of supervised depth information estimation, a laser radar or other depth sensor is used to collect real depth information serving as a supervisory signal during training. However, it is difficult to obtain dense depth information with high precision, which imposes restrictions on the training.

Figure 1:
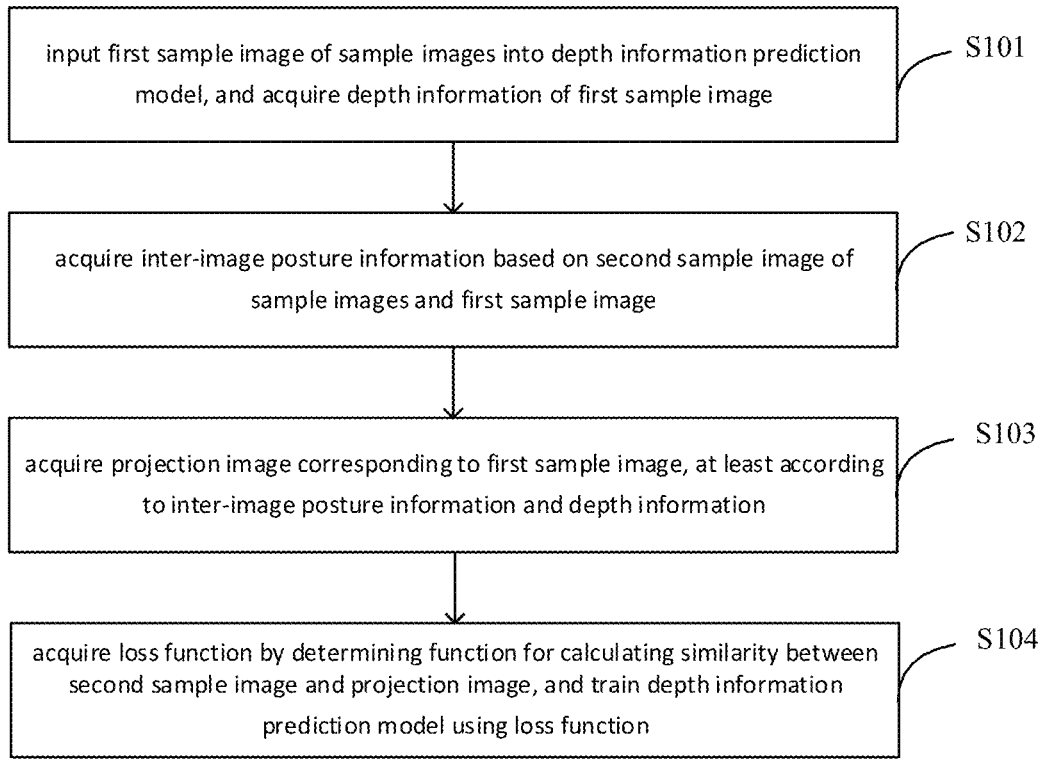
FIG. 1 shows a first flowchart of a model training method according to an embodiment of the present application.

An embodiment of the present application provides a model training method which is applicable to autonomous driving systems, such as autonomous vehicles and unmanned excavators, and also applicable to Augmented Reality (AR) and Virtual Reality (VR) technologies. Referring to FIG. 1, the method may include:

S101, a first sample image of sample images is input into a depth information prediction model, and depth information of the first sample image is acquired;

S102, inter-image posture information is acquired based on a second sample image of the sample images and the first sample image;

S103, a projection image corresponding to the first sample image is acquired, at least according to the inter-image posture information and the depth information; and S104, a loss function is acquired by determining a function for calculating the similarity between the second sample image and the projection image, and the depth information prediction model is trained using the loss function.

In the present application, an image is used as an input, and depth information corresponding to the image can be effectively estimated in a self-supervised manner, so that it is not necessary to use a laser radar or other depth sensor to collect high-precision depth information, thereby the above mentioned restrictions are avoided.

Therefore, according to the present application, such a problem that the depth information prediction model is restricted when a laser radar or other depth sensor is used to collect real depth information serving as a supervisory signal, may be solved. However, a person skilled in the art shall understand that the present application can solve other problems, either, not limited to the above problem only.

In an example, a color image is used as an input for self-supervised depth information estimation, and the whole method can be divided into two parts, including: estimation of inter-image posture information and estimation of image depth information. For example, giving two images $I_t$ 和 $I_{t+1}$, the image $I_t$ can be projected to the view of $I_{t+1}$ to produce a virtual image $I_t'$ according to the acquired inter-image posture information $P_t$ and depth information Dt corresponding to the image $I_t$. If the inter-image posture information $P_t$ and the depth information Dt are estimated accurately enough, the image $I_t'$ and the image $I_{t+1}$ will be similar enough, so that a function for calculating the similarity between the image $I_t'$ and the image $I_{t+1}$ is determined so as to acquire a loss function loss($I_{t+1}$,$I_t'$) and the depth information prediction model is trained using the loss function. Optionally, in S101, the sample images may be video frames, for example, the first sample image and the second sample image are two video frames with a preset number of frames interposed therebetween. Or, the first sample image and the second sample image are two consecutive video frames (e.g., $I_t$ and $I_{t+1}$). In addition, the first sample image and the second sample image may be otherwise selected so that the contents of the first sample image and the second sample image are similar. For example, the sample images include multi-frame images captured by two shooting devices (such as a binocular camera) in the same orientation, and the first sample image and the second sample image are images captured by the two shooting devices at the same time.

Optionally, the sample images are color images.

Figure 2:
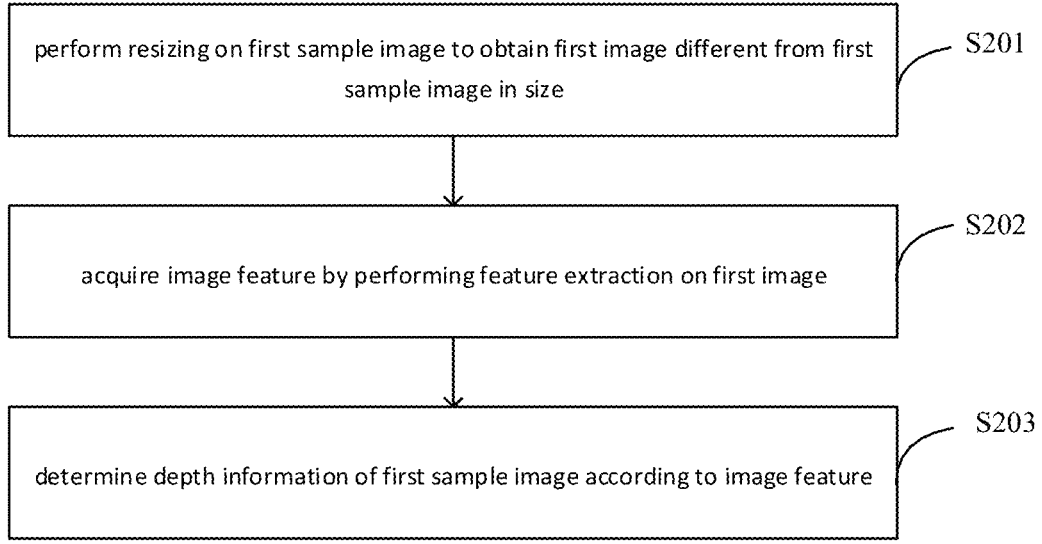
FIG. 2 shows a second flowchart of a model training method according to an embodiment of the present application.

In an embodiment, referring to FIG. 2, S101 that depth information of the first sample image is acquired, includes S201~S203.

In S201, resizing is performed on the first sample image to obtain a first image different from the first sample image in size.

Optionally, there are a plurality of first images, each having a different size.

Optionally, the resizing performed on the first sample image may be downsampling the first sample image. For example, an image having a size of M×N may be downsampled by a factor of s, thereby an image having a size of (M/s)×(N/s) is obtained.

In S202, an image feature is acquired by performing feature extraction on the first image.

In S203, the depth information of the first sample image is determined according to the image feature.

Optionally, when there are a plurality of first images, feature extraction is performed on each first image, and the image features of the plurality of first images are combined to determine the depth information of the first sample image.

The advantage of doing so is that, the first sample image is resized to obtain the first images with different sizes, so that feature information of the image in different sizes can be obtained, thereby extracting more comprehensive information, including both global overall information and local detailed information.

Figure 3:
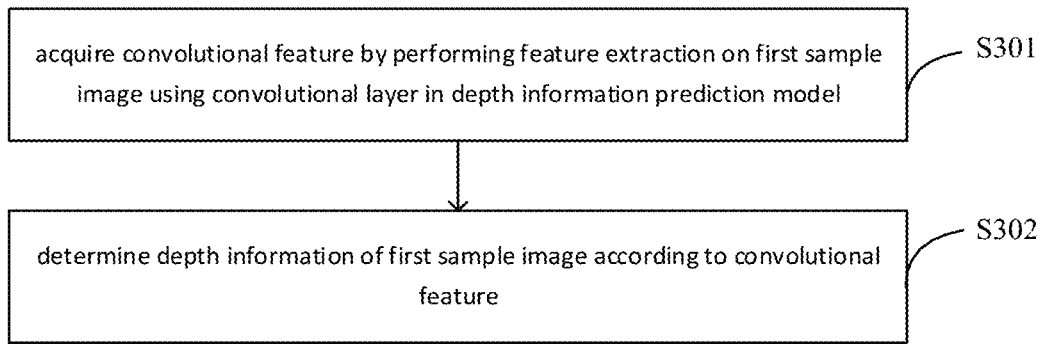
FIG. 3 shows a third flowchart of a model training method according to an embodiment of the present application.

In an embodiment, referring to FIG. 3, S101 that depth information of the first sample image is acquired, includes S301~S302.

In S301, a convolutional feature is acquired by performing feature extraction on the first sample image using a convolutional layer in the depth information prediction model.

Optionally, the depth information prediction model comprises a feature extraction network containing multiple convolutional layers, and features extracted using different convolutional layers are different in size. The convolutional feature extracted with each convolutional layer can be obtained by performing feature extraction on the first sample image directly using the feature extraction network, so that the convolutional features of multiple convolutional layers are acquired.

In S302, the depth information of the first sample image is determined according to the convolutional feature.

Optionally, when the convolutional features of multiple convolutional layers are acquired, the depth information of the first sample image may be determined by combining the convolutional features of multiple convolutional layers.

The advantage of doing so is that, the feature of the first sample image is extracted with various convolutional layers, thereby extracting more comprehensive feature information, including both global overall information and local detailed information.

Figure 4:
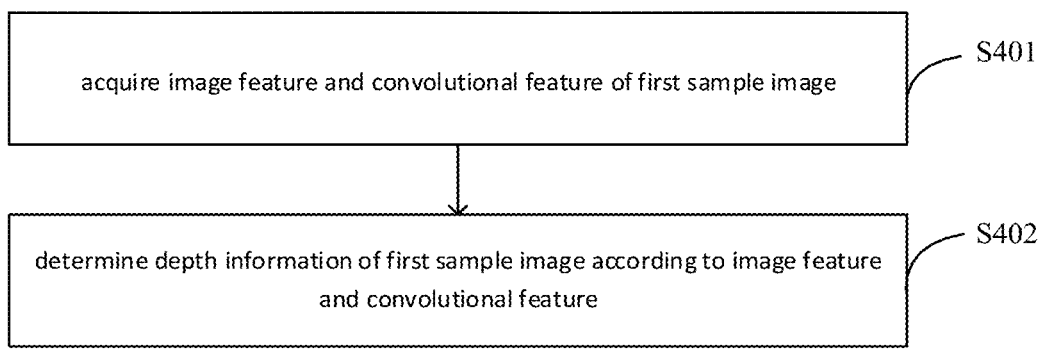
FIG. 4 shows a fourth flowchart of a model training method according to an embodiment of the present application.

In an embodiment, referring to FIG. 4, S101 that depth information of the first sample image is acquired, includes S401~S402.

In S401, an image feature and a convolutional feature of the first sample image are obtained, the image feature being acquired by performing feature extraction on a first image, the first image being an image different from the first sample image in size, the convolutional feature being acquired by performing feature extraction on the first sample image using a convolutional layer in the depth information prediction model; and In S402, the depth information of the first sample image is determined according to the image feature and the convolutional feature.

Optionally, the image feature and the convolutional feature is concatenated (concat), and the depth information of the first sample image is determined according to the concatenated feature;

for example, if there are image features of first images in multiple sizes and convolutional features acquired with multiple convolutional layers, S402 may include:
(1) an image feature and a convolutional feature of the same feature size are concatenated, and concatenated features of multiple sizes are obtained;
(2) intermediate depth information is determined based on the concatenated features of multiple sizes; and
(3) the depth information of the first sample image is determined based on the intermediate depth information.

In this embodiment, image features determined based on first images with different sizes and convolutional features extracted with different convolutional layers are combined, so that new feature information with stronger expressiveness is obtained, and therefore depth information with higher accuracy can be obtained.

Optionally, in the above operation (2) of S402, image reconstruction may be used to obtain the intermediate depth information. Specifically, the concatenated features of multiple sizes are subjected to a multilayer convolution operation and an activation function operation (e.g., sigmoid), and a plurality of depth images D={D1, . . . , Dn} corresponding to the concatenated features of multiple sizes are obtained. Similarly, in S203 and S302, the acquisition of the depth information based on the image feature or convolutional feature may also be performed according to this embodiment.

Optionally, after the concatenated features of multiple sizes are acquired, channel enhancement is performed on the concatenated features of multiple sizes to obtain enhanced features of multiple sizes. Through channel enhancement, effective information in the acquired features of multiple sizes can be effectively enhanced.

Figure 5:
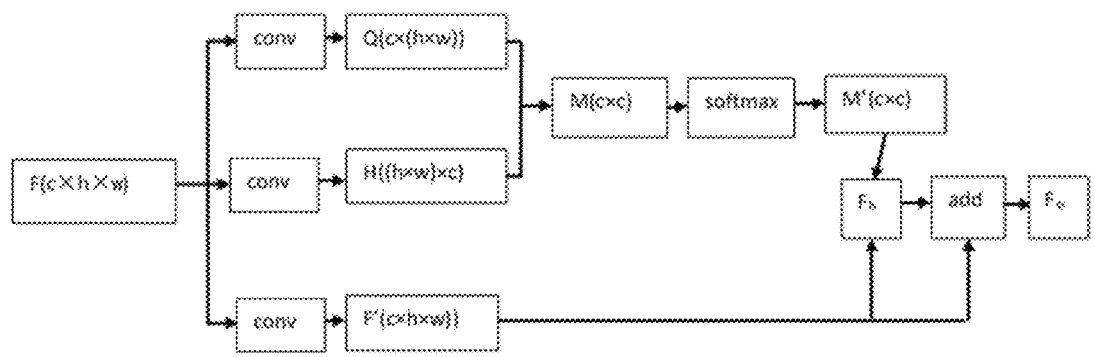
FIG. 5 shows a fifth flowchart of a model training method according to an embodiment of the present application.

Referring to FIG. 5, a feature F (c×w×h) is given, where c denotes the number of channels of the feature, w and h denote the width and height of the feature, respectively, and the process of channel enhancement is as follows:
(1) a convolution (cony) operation and a reshape function operation are performed on the feature F to obtain a feature Q (c×(h×w)) and a feature H ((h×w)×c);
(2) a matrix multiplication operation is performed on the feature Q (c×(h×w)) and the feature H ((h×w)×c) to obtain a matrix M (c×c), and then a logistic regression softmax operation is performed on the matrix M (c×c) to obtain a matrix M' (c×c);
(3) a convolution operation is performed on the feature F to obtain a new feature F' (c×h×w); and
(4) a matrix multiplication operation is performed on the feature F' (c×h×v) taking M' (c×c) as a weight to obtain an enhanced feature Fh (c×h×w); and a pixel-level addition operation is performed on the feature Fh and feature F' to obtain a final enhanced feature Fo.

Figure 6:
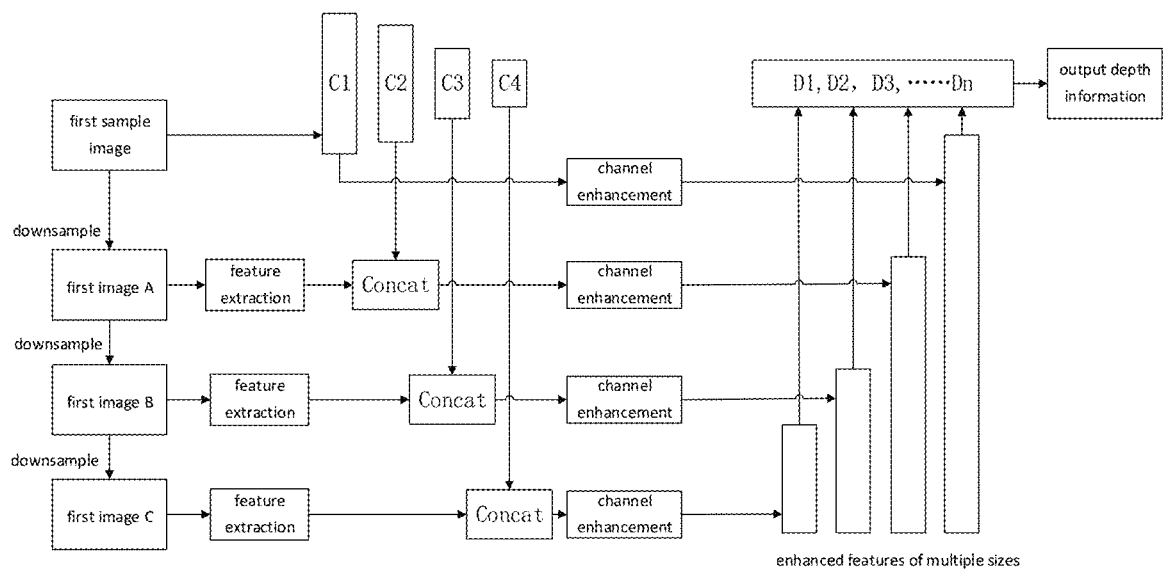
FIG. 6 shows an exemplary diagram of a depth information prediction model according to an embodiment of the present application.

Referring to FIG. 6, an exemplary diagram of the depth information prediction model is shown.

In a first step, the first sample image is downsampled to obtain first images of multiple sizes, such as a first image A, a first image B, and a first image C. Feature extraction is performed on each first image to obtain an image feature.

In addition, the first sample image is directly input into a feature extraction network in the depth information prediction model, where the feature extraction network contains multiple convolutional layers, such as a convolutional layer C1, a convolutional layer C2, and a convolutional layer C3 as illustrated. Feature extraction is performed in each convolutional layer to obtain a convolutional feature.

An image feature and a convolutional feature of the same feature size are concatenated (concat), and concatenated features of multiple sizes are obtained.

In a second step, after the concatenated features of multiple sizes are obtained, channel enhancement is performed on the concatenated features of multiple sizes to obtain enhanced features of multiple sizes. Through channel enhancement, effective information in the acquired features of multiple sizes can be effectively enhanced.

In a third step, after the channel-enhanced features of multiple sizes are obtained, image reconstruction is performed on the enhanced features of multiple sizes to obtain a plurality of depth images D={D1, . . . , Dn}.

In a fourth step, according to the plurality of depth images D={D1, . . . , Dn}, the depth information for final output is determined.

In an embodiment, S102 that inter-image posture information is acquired based on a second sample image of the sample images and the first sample image, includes:
(1) feature extraction is performed on the second sample image and the first sample image; and
(2) the inter-image posture information is acquired by performing regression on the extracted features of the second sample image and the first sample image. Optionally, the inter-image posture information $P_t$ comprises a plurality of rotation parameters and a plurality of translation parameters, for example, if a spatial rectangular coordinate system xyz is established, then there are correspondingly three rotation parameters and three translation parameters.

The advantage of doing so is that, the inter-image posture information is determined by performing feature extraction on the images and performing regression on the extracted features, so that the calculation result is more accurate.

Figure 7:
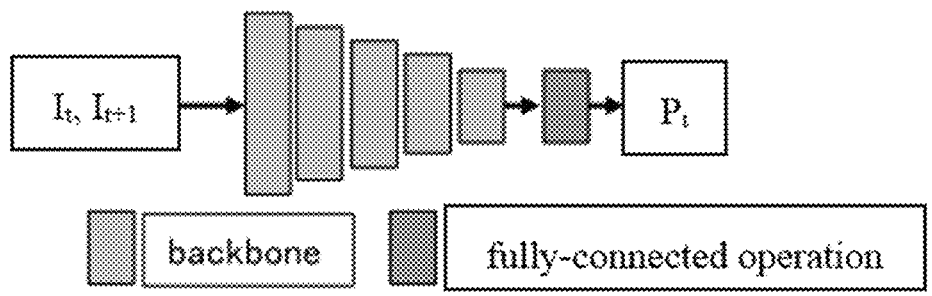
FIG. 7 shows a sixth flowchart of a model training method according to an embodiment of the present application.

FIG. 7 is an exemplary flowchart for implementing S102. Referring to FIG. 7, the first sample image and the second sample image (e.g., $I_t$ and $I_{t+1}$) are input into a convolutional neural network (e.g., backbone thereof), and feature extraction is performed with the convolutional neural network such as the backbone; and then regression is performed on the extracted features using a fully-connected network to obtain the final inter-frame posture result $P_t$. The backbone herein may be a common feature extraction network, such as resnet 18 or resnet 50.

In an embodiment, S103 that a projection image corresponding to the first sample image is acquired at least according to the inter-image posture information and the depth information, includes:
(1) a first collection parameter corresponding to the first sample image and a second collection parameter corresponding to the second sample image are acquired;
(2) first point cloud data of the first sample image is determined according to the depth information of the first sample image and the first collection parameter;

wherein the point cloud data refers to a data set of points in a certain coordinate system; and each point may contain a variety of information, such as three-dimensional coordinates, color, classification value, intensity value, and time;

(3) the first point cloud data is transformed into second point cloud data according to the inter-image posture information; and (4) the second point cloud data is projected according to the second collection parameter to obtain the projection image.

Specifically, it is assumed that the first collection parameter corresponding to the first sample image $I_t$ is $K_t$, the second collection parameter corresponding to the second sample image $I_{t+1}$ is $K_{t+1}$, and both $K_t$ and $K_{t+1}$ are matrices. According to the depth information Dt corresponding to $I_t$, the first point cloud data $P_{dt}=K_t^{-1} \times D_t$ is obtained. According to the inter-image posture information $P_t$, the first point cloud data $P_{dt}$ can be transformed into the second point cloud data $P_{dt+1}$ in a view corresponding to the second sample image $I_{t+1}$: $P_{dt+1}=P_t \times P_{dt}$. Finally, the second point cloud data $P_{dt+1}$ is projected according to the second collection parameter $K_{t+1}$ to obtain a projection image $I_t'$: $I_t'=K_{t+1} \times P_{dt+1}$.

The advantage of doing so is that, by performing the steps described above, the projection image of the first sample image in the view of the second sample image can be obtained by utilizing the collection parameters, inter-image posture information and depth information of image acquisition, and the accuracy of the depth information can be validated based on the similarity between the projection image and the second sample image. The method is simple in calculation and easy to implement, and does not need other hardwares to collect information, so that the cost is greatly reduced.

In an embodiment, the loss function determined in S104 may be Structural SIMilarity (SSIM) between the second sample image and the projection image, which is an index that assesses the similarity between two images.

An example of the loss function is as follows:

$$\mathrm{loss}(I_{t+1}, I_t') = \mathrm{SSIM}(I_{t+1}, I_t')$$

In other embodiments, the similarity may be calculated using other methods, for example, cosine similarity, histogram-based, mutual information-based, or image fingerprint information-based similarity calculation methods.

In another embodiment, for the case of the (2) in S402 that a plurality of depth images $D=\{D1, \ldots, Dn\}$ corresponding to the features of multiple sizes may be obtained, correspondingly in S102, a plurality of projection images corresponding to the first sample image may be acquired according to the inter-image posture information and the plurality of depth images.

The loss function determined in S104 may further include: the similarity between the second sample image and each of the plurality of depth images is calculated, and a weighted sum of the plurality of similarities is calculated, wherein the similarity is positively related to the size of the depth image. An example of the loss function is as follows:

$$\mathrm{loss} = \sum_{i=1}^{n} w_i \, \mathrm{loss}(I_{t+1}, I_t^i)$$

wherein the weight of the similarity is $W_i=\frac{1}{2}^k$, where k is related to the size of the depth image, for example, the value of k can be determined according to the factor of downsampling for producing the current depth image.

Figure 8:
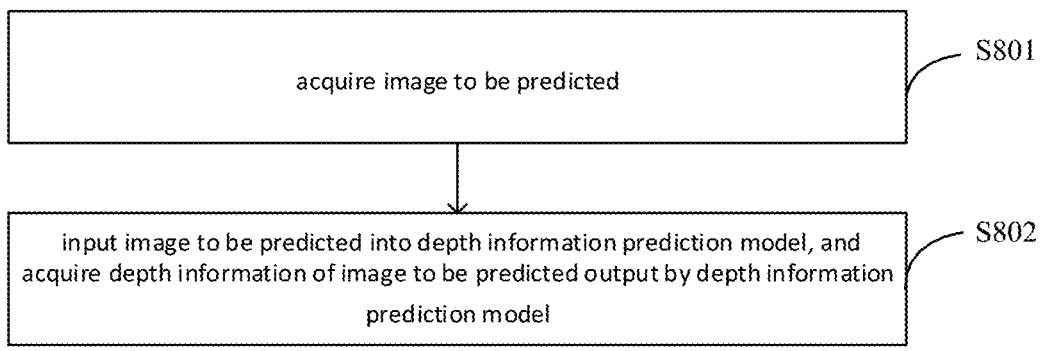
FIG. 8 shows a flowchart of a prediction method according to an embodiment of the present application.

Correspondingly, referring to FIG. 8, an embodiment of the present application provides a prediction method, including:

S801, an image to be predicted is acquired; and

S802, the image to be predicted is input into a depth information prediction model, and depth information of the image to be predicted output by the depth information prediction model is acquired;

wherein the depth information prediction model is trained using the model training method provided in the present application. In addition, the depth information prediction model may also be implemented according to the above embodiment and will not be described in detail herein.

Figure 9:
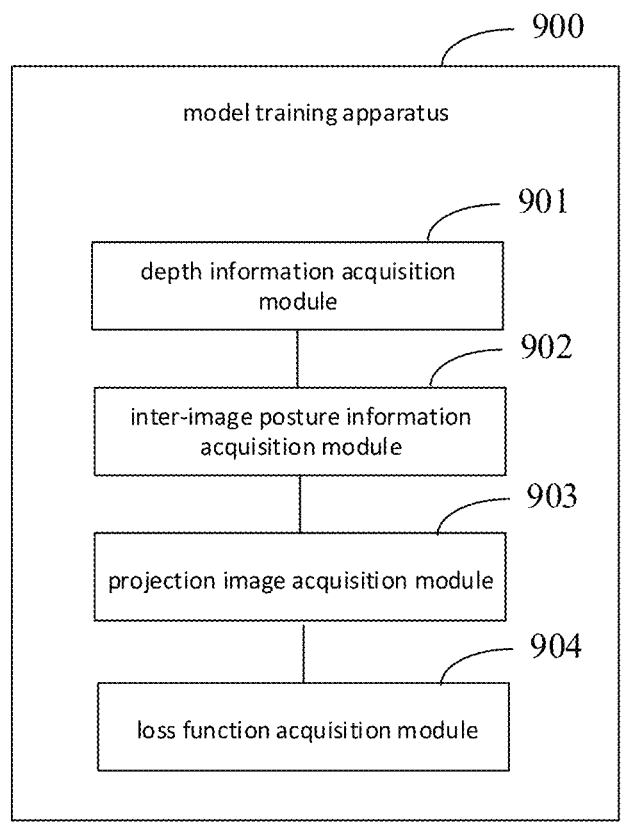
FIG. 9 shows a block diagram of a model training apparatus according to an embodiment of the present application.

Correspondingly, referring to FIG. 9, an embodiment of the present application provides a model training apparatus 900, including:

a depth information acquisition module 901 for inputting a first sample image of sample images into a depth information prediction model, and acquiring depth information of the first sample image;

an inter-image posture information acquisition module 902 for acquiring inter-image posture information based on a second sample image of the sample images and the first sample image;

a projection image acquisition module 903 for acquiring a projection image corresponding to the first sample image at least according to the inter-image posture information and the depth information; and a loss function acquisition module 904 for acquiring a loss function by determining a function for calculating the similarity between the second sample image and the projection image, and training the depth information prediction model using the loss function.

In an embodiment, the depth information acquisition module 901 includes:

an image resizing sub-module for performing resizing on the first sample image to obtain a first image different from the first sample image in size;

an image feature acquisition sub-module for acquiring an image feature by performing feature extraction on the first image; and a first depth information acquisition sub-module for determining the depth information of the first sample image according to the image feature.

In an embodiment, the depth information acquisition module 901 includes:

a convolutional feature acquisition sub-module for acquiring a convolutional feature by performing feature extraction on the first sample image using a convolutional layer in the depth information prediction model; and a second depth information acquisition sub-module for determining the depth information of the first sample image according to the convolutional feature.

In an embodiment, the depth information acquisition module 901 includes:

a feature acquisition sub-module for acquiring an image feature and a convolutional feature of the first sample image, the image feature being acquired by performing feature extraction on a first image, the first image being an image different from the first sample image in size, the convolutional feature being acquired by performing feature extraction on the first sample image using a convolutional layer in the depth information prediction model; and a third depth information acquisition sub-module for determining the depth information of the first sample image according to the image feature and the convolutional feature.

In an embodiment, the inter-image posture information acquisition module 902 includes:

a feature extraction sub-module for performing feature extraction on the second sample image and the first sample image; and an inter-image posture information sub-module for acquiring the inter-image posture information by performing regression on the extracted features of the second sample image and the first sample image.

In an embodiment, the projection image acquisition module 903 includes:

a collection parameter acquisition sub-module for acquiring a first collection parameter corresponding to the first sample image and a second collection parameter corresponding to the second sample image;

a first point cloud data acquisition sub-module for determining first point cloud data of the first sample image according to the depth information of the first sample image and the first collection parameter;

a second point cloud data acquisition sub-module for transforming the first point cloud data into second point cloud data according to the inter-image posture information; and a projection sub-module for projecting the second point cloud data according to the second collection parameter to obtain the projection image.

Figure 10:
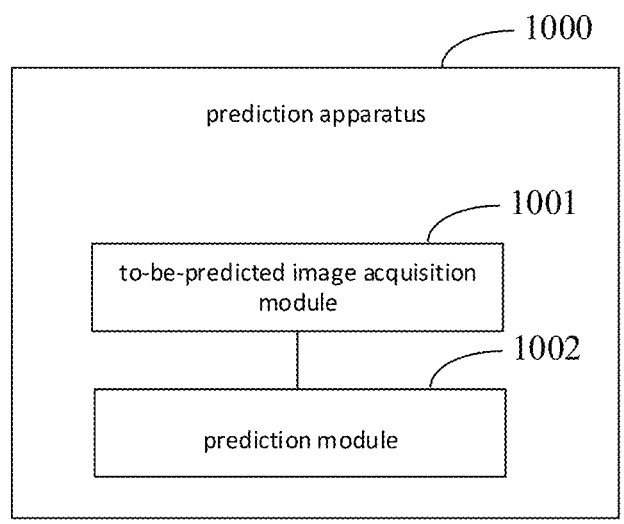
FIG. 10 shows a block diagram of a prediction apparatus according to an embodiment of the present application.

Correspondingly, referring to FIG. 10, an embodiment of the present application further provides a prediction apparatus 1000, including:

a to-be-predicted image acquisition module 1001 for acquiring an image to be predicted; and a prediction module 1002 for inputting the image to be predicted into a depth information prediction model, and acquiring depth information of the image to be predicted output by the depth information prediction model;

wherein the depth information prediction model is trained using the model training apparatus provided in the present application.

According to embodiments of the present application, the present application further provides an electronic device and a readable storage medium.

Figure 11:
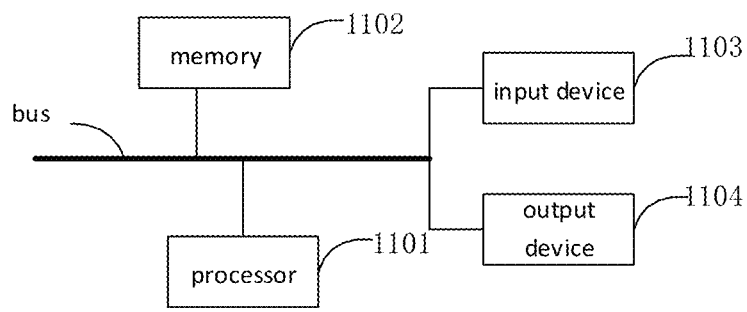
FIG. 11 shows a block diagram of an electronic device for implementing the model training method or the prediction method according to an embodiment of the present application.

As shown in FIG. 11, a block diagram of an electronic device for implementing the model training method or the prediction method according to an embodiment of the present application is shown. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as personal digital assistants, cellular telephones, smart phones, wearable devices, and other similar computing devices. The components shown herein, their connections and relationships, and their functions are by way of example only and are not intended to limit the implementations of the application described and/or claimed herein.

As shown in FIG. 11, the electronic device includes: one or more processors 1101, a memory 1102, and interfaces for connecting various components, including high-speed interfaces and low-speed interfaces. The various components are interconnected using different buses and may be mounted on a common motherboard or otherwise as desired. The processor may process instructions for execution within the electronic device, including instructions stored in the memory or on the memory to display graphical information of the GUI on an external input/output device, such as a display device coupled to the interface. In other embodiments, multiple processors and/or multiple buses may be used with multiple memories and multiple storages, if desired. Also, multiple electronic devices may be connected, each providing some of the necessary operations (e.g., as an array of servers, a set of blade servers, or a multiprocessor system). An example of one processor 1101 is shown in FIG. 11.

The memory 1102 is a non-transitory computer-readable storage medium provided in the present application. The memory stores instructions executable by at least one processor to cause the at least one processor to perform the model training method or the prediction method provided herein. The non-transitory computer-readable storage medium of the present application stores computer instructions for causing a computer to perform the model training method or the prediction method provided herein.

The memory 1102, as a non-transitory computer-readable storage medium, may be used to store non-transitory software programs, non-transitory computer-executable programs, and modules, such as program instructions/modules corresponding to the model training method in the embodiments of the present application (e.g., the depth information acquisition module 901, the inter-image posture information acquisition module 902, the projection image acquisition module 903, and the loss function acquisition module 904 shown in FIG. 9). The processor 1101 executes various functional applications of the server and data processing, i.e., implementing the model training method in the method embodiments described above, by running the non-transitory software programs, instructions, and modules stored in the memory 1102.

The memory 1102 can include a program storage area and a data storage area, wherein the program storage area can store application programs required by an operating system and at least one function; the data storage area can store data created according to the use of the model training electronic device, etc. Additionally, the memory 1102 may include high speed random access memory, and may also include non-transitory memory, such as at least one magnetic disk storage device, flash memory device, or other non-transitory solid state memory device. In some embodiments, the memory 1102 optionally includes memories remotely located with respect to the processor 1101, and the remote memories may be connected to the model training electronic device via a network. Examples of the network include, but are not limited to, the Internet, intranets, local area networks, mobile communication networks, and combinations thereof.

The electronic device for the model training method or the prediction method may further include: an input device 1103 and an output device 1104. The processor 1101, the memory 1102, the input device 1103, and the output device 1104 may be connected via a bus or otherwise connected, as illustrated in FIG. 11 taking bus connection as an example.

The input device 1103 may receive inputted numeric or character information and generate key signal inputs related to user settings and functional controls of the model training electronic device, for example, the input device may include a touch screen, a keypad, a mouse, a trackpad, a touch pad, a pointing stick, one or more mouse buttons, a trackball, a joystick and other input devices. The output devices 1104 may include a display device, an auxiliary lighting device (e.g., LED), a tactile feedback device (e.g., a vibration motor), etc. The display device may include, but is not limited to, a liquid crystal display (LCD), a light emitting diode (LED) display, and a plasma display. In some embodiments, the display device may be a touch screen.

Various embodiments of the systems and techniques described herein may be implemented in digital electronic circuitry, integrated circuit systems, ASICs (application-specific integrated circuits), computer hardware, firmware, software, and/or combinations thereof. These various embodiments may include implementation in one or more computer programs that may be executed and/or interpreted on a programmable system including at least one programmable processor, which may be a dedicated or general purpose programmable processor, that can receive data and instructions from a storage system, at least one input device, and at least one output device, and transmit data and instructions to the storage system, the at least one input device, and the at least one output device.

These computing programs (also referred to as programs, software, software applications, or code) include machine instructions of a programmable processor, and may be implemented using high-level procedural and/or object-oriented programming languages, and/or assembly/machine languages. As used herein, the terms "machine-readable medium" and "computer-readable medium" refer to any computer program product, apparatus, and/or device (e.g., magnetic disk, optical disk, memory, programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

To provide for interaction with a user, the systems and techniques described herein may be implemented on a computer having: a display device (e.g., a CRT (cathode ray tube) or LCD (liquid crystal display) monitor) for displaying information to a user; and a keyboard and a pointing device (e.g., a mouse or a trackball) through which a user can provide input to the computer. Other types of devices may also be used to provide interaction with a user; for example, the feedback provided to the user may be any form of sensory feedback (e.g., visual feedback, auditory feedback, or tactile feedback); and input from the user may be received in any form (including acoustic input, voice input, or tactile input).

The systems and techniques described herein may be implemented in a computing system that includes a background component (e.g., as a data server), or a computing system that includes a middleware component (e.g., an application server), or a computing system that includes a front-end component (e.g., a user computer having a graphical user interface or a web browser through which a user may interact with embodiments of the systems and techniques described herein), or in a computing system that includes any combination of such background components, middleware components, or front-end components. The components of the system may be interconnected by any form or medium of digital data communication (e.g., a communication network). Examples of communication networks include: Local Area Networks (LANs), Wide Area Networks (WANs), and the Internet.

The computer system may include a client and a server. The client and server are typically remote from each other and typically interact through a communication network. The relationship of the client and the server is generated by computer programs running on respective computers and having a client-server relationship with each other. The server can be a cloud server, also called a cloud computing server or a cloud host, is a host product in a cloud computing service system, and solves the defects of high management difficulty and weak business expansibility in the traditional physical host and virtual private server (VPS) service.

It will be appreciated that the various forms of flows described above may be used, and the steps may be reordered, added or deleted. For example, the steps recited in the present application may be performed in parallel or sequentially or may be performed in a different order, so long as the desired results of the technical solutions disclosed in the present application can be achieved, and no limitation is made herein.

The above-described embodiments are not to be construed as limiting the scope of the present application. It will be apparent to those skilled in the art that various modifications, combinations, sub-combinations and substitutions are possible, depending on design requirements and other factors. Any modifications, equivalents, and improvements within the spirit and principles of this application are intended to be included within the scope of this application.

What is claimed is:

1. A model training method, comprising:
   inputting a first sample image of sample images into a depth information prediction model, and acquiring depth information of the first sample image;
   acquiring inter-image posture information based on a second sample image of the sample images and the first sample image;
   acquiring a projection image of the first sample image in a view of the second sample image, at least according to the inter-image posture information and the depth information; and
   acquiring a loss function by determining a function for calculating a similarity between the second sample image and the projection image, and training the depth information prediction model using the loss function;
   wherein, the depth information of the first sample image is acquired by:
   concatenating an image feature and a convolutional feature of a same feature size to obtain concatenated features of multiple sizes;
   determining intermediate depth information based on the concatenated features of multiple sizes; and
   determining the depth information of the first sample image based on the intermediate depth information.

2. The model training method according to claim 1, wherein the acquiring depth information of the first sample image, comprises:
   performing resizing on the first sample image to obtain a first image different from the first sample image in size;
   acquiring the image feature by performing feature extraction on the first image; and
   determining the depth information of the first sample image according to the image feature.

3. The model training method according to claim 1, wherein the acquiring depth information of the first sample image, comprises:
   acquiring the convolutional feature by performing feature extraction on the first sample image using a convolutional layer in the depth information prediction model; and determining the depth information of the first sample image according to the convolutional feature.

4. The model training method according to claim 2, wherein the acquiring depth information of the first sample image, comprises:
acquiring the convolutional feature by performing feature extraction on the first sample image using a convolutional layer in the depth information prediction model; and
determining the depth information of the first sample image according to the convolutional feature.

5. The model training method according to claim 1, wherein the acquiring depth information of the first sample image, comprises:
acquiring the image feature and the convolutional feature of the first sample image, the image feature being acquired by performing feature extraction on a first image, the first image being an image different from the first sample image in size, the convolutional feature being acquired by performing feature extraction on the first sample image using a convolutional layer in the depth information prediction model; and
determining the depth information of the first sample image according to the image feature and the convolutional feature.

6. The model training method according to claim 1, wherein the acquiring inter-image posture information based on the second sample image of the sample images and the first sample image, comprises:
performing feature extraction on the second sample image and the first sample image; and
acquiring the inter-image posture information by performing regression on the extracted features of the second sample image and the first sample image.

7. The model training method according to claim 5, wherein the acquiring inter-image posture information based on the second sample image of the sample images and the first sample image, comprises:
performing feature extraction on the second sample image and the first sample image; and
acquiring the inter-image posture information by performing regression on the extracted features of the second sample image and the first sample image.

8. The model training method according to claim 1, wherein
the acquiring the projection image of the first sample image in the view of the second sample image, at least according to the inter-image posture information and the depth information, comprises:
acquiring a first collection parameter corresponding to the first sample image and a second collection parameter corresponding to the second sample image;
determining first point cloud data of the first sample image, according to the depth information of the first sample image and the first collection parameter;
transforming the first point cloud data into second point cloud data, according to the inter-image posture information; and
projecting the second point cloud data according to the second collection parameter to obtain the projection image.

9. The model training method according to claim 5, wherein
the acquiring the projection image of the first sample image in the view of the second sample image, at least according to the inter-image posture information and the depth information, comprises:
acquiring a first collection parameter corresponding to the first sample image and a second collection parameter corresponding to the second sample image;
determining first point cloud data of the first sample image, according to the depth information of the first sample image and the first collection parameter;
transforming the first point cloud data into second point cloud data, according to the inter-image posture information; and
projecting the second point cloud data according to the second collection parameter to obtain the projection image.

10. A prediction method, comprising:
acquiring an image to be predicted; and
inputting the image to be predicted into a depth information prediction model, and acquiring depth information of the image to be predicted output by the depth information prediction model;
wherein the depth information prediction model is trained using a model training method comprising:
inputting a first sample image of sample images into a depth information prediction model, and acquiring depth information of the first sample image;
acquiring inter-image posture information based on a second sample image of the sample images and the first sample image;
acquiring a projection image of the first sample image in a view of the second sample image, at least according to the inter-image posture information and the depth information; and
acquiring a loss function by determining a function for calculating a similarity between the second sample image and the projection image, and training the depth information prediction model using the loss function;
wherein, the depth information of the first sample image is acquired by:
concatenating an image feature and a convolutional feature of a same feature size to obtain concatenated features of multiple sizes;
determining intermediate depth information based on the concatenated features of multiple sizes; and
determining the depth information of the first sample image based on the intermediate depth information.

11. A prediction method, comprising:
acquiring an image to be predicted; and
inputting the image to be predicted into a depth information prediction model, and acquiring depth information of the image to be predicted output by the depth information prediction model;
wherein the depth information prediction model is trained using a model training method comprising:
inputting a first sample image of sample images into a depth information prediction model, and acquiring depth information of the first sample image;
acquiring inter-image posture information based on a second sample image of the sample images and the first sample image;
acquiring a projection image of the first sample image in a view of the second sample image, at least according to the inter-image posture information and the depth information; and
acquiring a loss function by determining a function for calculating the similarity between the second sample image and the projection image, and training the depth information prediction model using the loss function,
wherein, the acquiring depth information of the first sample image, comprises:

performing resizing on the first sample image to obtain a first image different from the first sample image in size;
acquiring an image feature by performing feature extraction on the first image; and
determining the depth information of the first sample image according to the image feature;
wherein, the depth information of the first sample image is acquired by:
concatenating the image feature and a convolutional feature of a same feature size to obtain concatenated features of multiple sizes;
determining intermediate depth information based on the concatenated features of multiple sizes; and
determining the depth information of the first sample image based on the intermediate depth information.

12. A prediction method, comprising:
acquiring an image to be predicted; and
inputting the image to be predicted into a depth information prediction model, and acquiring depth information of the image to be predicted output by the depth information prediction model;
wherein the depth information prediction model is trained using a model training method comprising:
inputting a first sample image of sample images into a depth information prediction model, and acquiring depth information of the first sample image;
acquiring inter-image posture information based on a second sample image of the sample images and the first sample image;
acquiring a projection image of the first sample image in a view of the second sample image, at least according to the inter-image posture information and the depth information; and
acquiring a loss function by determining a function for calculating the similarity between the second sample image and the projection image, and training the depth information prediction model using the loss function,
wherein, the acquiring depth information of the first sample image, comprises:
acquiring a convolutional feature by performing feature extraction on the first sample image using a convolutional layer in the depth information prediction model; and
determining the depth information of the first sample image according to the convolutional feature;
wherein, the depth information of the first sample image is acquired by:
concatenating an image feature and the convolutional feature of a same feature size to obtain concatenated features of multiple sizes;
determining intermediate depth information based on the concatenated features of multiple sizes; and
determining the depth information of the first sample image based on the intermediate depth information.

13. A model training apparatus, comprising:
a processor and a memory for storing one or more computer programs executable by the processor,
wherein when executing at least one of the computer programs, the processor is configured to perform operations comprising:
inputting a first sample image of sample images into a depth information prediction model, and acquiring depth information of the first sample image;
acquiring inter-image posture information based on a second sample image of the sample images and the first sample image;
acquiring a projection image of the first sample image in a view of the second sample image, at least according to the inter-image posture information and the depth information; and
acquiring a loss function by determining a function for calculating a similarity between the second sample image and the projection image, and training the depth information prediction model using the loss function;
wherein, the depth information of the first sample image is acquired by:
concatenating an image feature and a convolutional feature of a same feature size to obtain concatenated features of multiple sizes;
determining intermediate depth information based on the concatenated features of multiple sizes; and
determining the depth information of the first sample image based on the intermediate depth information.

14. The model training apparatus according to claim 13, wherein when executing at least one of the computer programs, the processor is configured to further perform operations comprising:
performing resizing on the first sample image to obtain a first image different from the first sample image in size;
acquiring the image feature by performing feature extraction on the first image; and
determining the depth information of the first sample image according to the image feature.

15. The model training apparatus according to claim 13, wherein when executing at least one of the computer programs, the processor is configured to further perform operations comprising:
acquiring the convolutional feature by performing feature extraction on the first sample image using a convolutional layer in the depth information prediction model; and
determining the depth information of the first sample image according to the convolutional feature.

16. The model training apparatus according to claim 13, wherein when executing at least one of the computer programs, the processor is configured to further perform operations comprising:
acquiring the image feature and the convolutional feature of the first sample image, the image feature being acquired by performing feature extraction on a first image, the first image being an image different from the first sample image in size, the convolutional feature being acquired by performing feature extraction on the first sample image using a convolutional layer in the depth information prediction model; and
determining the depth information of the first sample image according to the image feature and the convolutional feature.

17. The model training apparatus according to claim 13, wherein when executing at least one of the computer programs, the processor is configured to further perform operations comprising:
performing feature extraction on the second sample image and the first sample image; and
acquiring the inter-image posture information by performing regression on the extracted features of the second sample image and the first sample image.

18. The model training apparatus according to claim 13, when executing at least one of the computer programs, the processor is configured to further perform operations comprising:

acquiring a first collection parameter corresponding to the first sample image and a second collection parameter corresponding to the second sample image;

determining first point cloud data of the first sample image, according to the depth information of the first sample image and the first collection parameter;

transforming the first point cloud data into second point cloud data, according to the inter-image posture information; and projecting the second point cloud data according to the second collection parameter to obtain the projection image.

19. A prediction apparatus, comprising:

a processor and a memory for storing one or more computer programs executable by the processor, wherein when executing at least one of the computer programs, the processor is configured to perform operations comprising:

acquiring an image to be predicted; and inputting the image to be predicted into a depth information prediction model, and acquiring depth information of the image to be predicted output by the depth information prediction model;

wherein the depth information prediction model is trained using the model training apparatus of claim 13.

20. A non-transitory computer-readable storage medium storing computer instructions for causing the computer to perform the method of claim 1.

* * * * *